United States Patent Office 2,750,365
Patented June 12, 1956

2,750,365

1,2,3,4,4a,9,10,10a - OCTAHYDRO-9-HYDROXY-1-HYDROXYMETHYL-7-ISOPROPENYL-1,4a- DIMETHYLPHENANTHRENE

Lee A. Subluskey, Wilmington, Del., assignor to Hercules Powder Company, Wilmington, Del., a corporation of Delaware No Drawing. Application May 5, 1955,
Serial No. 506,376

3 Claims. (Cl. 260—97)

The present invention relates to novel and useful compounds derivable from dehydroabietic acid.

In accordance with the invention, it has been found that a new compound of the following formula can be prepared:

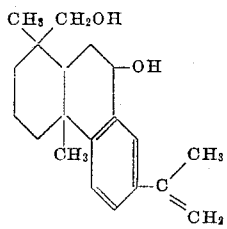

The compound of the above formula exists in the form of two epimerides. In one case, the hydroxy group in the 9-position is in trans position with reference to the methyl group which is attached to the 4a carbon atom of the phenanthrene nucleus. In the other epimeric form, the hydroxy group in the 9-position is in cis relationship to the methyl group in the 4a position. These new epimerides are named herein, respectively, as 1,2,3,4,4a,9,10,10a-octahydro - 9α - hydroxy - 1 - hydroxymethyl - 7 - isopropenyl-1,4a-dimethylphenanthrene and 1,2,3,4,4a,9,10,10a-octahydro - 9β - hydroxy - 1 - hydroxymethyl - 7 - isopropenyl-1,4a-dimethylphenanthrene. For convenience, the epimerides will be referred to hereinafter as the 9α-epimeride and the 9β-epimeride.

The epimerides of the invention can be prepared by numerous methods. One method comprises bromination of the dibenzoate of 9-hydroxy dehydroabietyl alcohol followed by dehydrobromination and saponification and is described in my copending application Serial No. 325,891, filed December 13, 1952. Another method comprises reduction of 9-acetoxy-1,2,3,4,4a,9,10,10a-octahydro-7-isopropenyl-1,4a-dimethyl-1-phenanthrene carboxylic acid (a compound disclosed in my copending application Serial No. 325,892, filed December 9, 1952) by means of an alkali metal aluminum hydride. Still another method comprises the dehydrogenation of the methyl ester of 14-acetoxy-1,2,3,4,4a,9,10,10a-octahydro-1,4a-dimethyl-9-oxo-1-phenanthrene carboxylic acid to produce a compound having the isopropenyl group in the 7-position followed by reduction of this latter compound with an alkali metal aluminum hydride. The starting methyl ester in the latter method is disclosed in the copending application of Thomas F. Sanderson, Serial No. 496,913, filed March 25, 1955.

In the first two of the above methods, the product will be either the 9α-epimeride or 9β-epimeride or a mixture of both depending on the epimeric form of the starting compound. In the third of the above methods, the product is predominantly 9β-epimeride.

The following specific examples illustrate the preparation of the compounds of the invention. Parts and percentages are by weight unless otherwise specified.

Example 1

Approximately 10 parts of 9β-benzoxy-14-bromodehydroabietyl benzoate was dissolved in 79 parts of acetone and treated with 10 parts of sodium carbonate and 10 parts of sodium iodide. This mixture was refluxed for one hour and then diluted with 1000 parts of water and finally extracted with ether. Evaporation of the ether extract yielded a white solid. Recrystallization from hexane gave 5.6 parts of 9β-hydroxy-14(15)-dehydro-dehydroabietyl benzoate, M. P. 110–111° C.

Five grams of the above product was refluxed for two hours in a solution of 5 parts of NaOH in 120 parts of ethanol. This reaction mixture was then diluted with water and extracted with ether. Evaporation of the ether extract yielded an oil which crystallized from aqueous methanol. Two recrystallizations gave the pure crystalline 9β-epimeride; M. P. 152–152.5° C.;

$$\lambda_{max.}^{alc.} \ 250 \ m\mu \ (\epsilon = 10{,}000)$$

*Analysis.*—Calculated for $C_{20}H_{29}O_2$: C, 79.69; H, 9.70; OH, 11.25. Found: C, 79.84; H, 9.79; OH (Zere.), 11.35.

Example 2

To a stirring mixture of 5 parts of lithium aluminum hydride and 1080 parts of ether there was added 9.5 parts of 9α - acetoxy - 1,2,3,4,4a,9,10,10a - octahydro - 7 - isopropenyl-1,4a-dimethyl-1-phenanthrene carboxylic acid. After stirring the reaction mixture for 36 hours, excess lithium aluminum hydride was destroyed by the addition of ethyl acetate. There was then added 1000 parts of water and stirring was continued for two additional hours. The ether phase was separated, dried and evaporated to yield 7.69 parts of crude product. Recrystallization from methanol gave 6.13 parts of 9α-epimeride; M. P. 96–115° C. indefinite;

$$\lambda_{max.}^{alc.} \ 249 \ m\mu \ (\epsilon = 13{,}800)$$

Example 3

A mixture consisting of 4.5 parts of the methyl ester of 14-acetoxy-1,2,3,4,4a,9,10,10a - octahydro - 1,4a - dimethyl-9-oxo-1-phenanthrene carboxylic acid and 1 part of a commercial 5% palladium-on-activated carbon catalyst was pyrolytically distilled at 0.3 mm. pressure to yield 2.1 parts of the methyl ester of 1,2,3,4,4a,9,10,10a-octahydro-7-isopropenyl-9-oxo-1-phenanthrene carboxylic acid; M. P. 81–82° C.;

$$\lambda_{max.}^{alc.} \ 240 \ m\mu \ (\epsilon, \ 30{,}000), \ 316 \ m\mu \ (\epsilon, \ 1{,}500)$$

*Analysis.*—Calculated for $C_{21}H_{26}O_3$: C, 77.27; H, 8.03. Found: C, 77.56; H, 8.07.

Into a reaction vessel equipped with a stirrer, thermometer and reflux condenser there was placed 3.5 parts of lithium aluminum hydride and 576 parts of dry ether. The mixture was stirred while adding 9.25 parts of the methyl ester prepared and identified above. After stirring at room temperature for 15 hours, 18 parts of ethyl acetate was added and following this, 180 parts of water. After another 2 hours of stirring, the resulting ether phase was separated, washed and dried. Evaporation yielded 8.3 parts of crude product. Recrystallization from ethyl acetate yielded pure 9β-epimeride, M. P. 152–152.5° C.

As is apparent, the epimerides of the invention are characterized by two reactive hydroxyl groups and the unsaturated isopropenyl group. Because of these reactive groups, the compounds are useful in many different ways. They may be reacted, for example, with carboxylic acids by known esterification techniques to form diesters or with dicarboxylic acids to form polyesters. The benzoic acid ester is prepared, for instance, by reacting one mole of either epimeride with 2 moles of benzoic acid.

The compounds of the invention and their carboxylic acid esters also are capable of polymerization as well as copolymerization with a variety of monomeric compounds. The following example is illustrative:

A regular GR-S polymerization was carried out wherein part of the styrene was replaced with the benzoic acid diester of the 9β-epimeride. A control was also carried out wherein the ester was omitted.

|  | Parts | |
| --- | --- | --- |
|  | Example | Control |
| Butadiene | 72 | 72 |
| Styrene | 18 | 10 |
| Dibenzoate of 9k-epimeride | 10 |  |
| Water | 180 | 180 |
| Potassium persulfate | 0.3 | 0.3 |
| Sodium salt of disproportionated rosin | 5.0 | 5.0 |
| Mixed tertiary mercaptan (chiefly $C_{12}$) | 0.4 | 0.4 |

These polymerizations were held at 40° C. for 20 hours. After removal of the unreacted butadiene, addition of a hydroquinone (0.2 part) short stopper and phenyl β-naphthylamine antioxidant (1 part), the polymer was precipitated by addition of excess 1% sulfuric acid and then dried. The modified GR-S polymer had a specific viscosity (1% benzene solution) of 2.09 and the control, 2.29. After removal of the unbound rosin materials by reprecipitations, an ultraviolet analysis showed that the modified polymer contained 9% of the benzoic acid diester. This polymer had better physical properties, particularly in respect to elasticity, than the control GR-S even though it was a lower viscosity polymer.

Thus, the esters of the compounds of this invention may be used as a partial replacement for styrene in a standard GR-S formulation and obtain a rubber whose properties approach those of the so-called "cold rubber" without the necessity of resorting to cold rubber techniques.

This application is a continuation-in-part of my co-pending application Serial No. 325,891 filed December 13, 1952.

What I claim and desire to protect by Letters Patent is:

1. 1,2,3,4,4a,9,10,10a - octahydro - 9 - hydroxy - 1-hydroxymethyl - 7 - isopropenyl - 1,4a - dimethylphenanthrene.

2. 1,2,3,4,4a,9,10,10a - octahydro - 9α - hydroxy - 1-hydroxymethyl - 7 - isopropenyl - 1,4a - dimethylphenanthrene.

3. 1,2,3,4,4a-9,10,10a - octahydro - 9β - hydroxy - 1-hydroxymethyl - 7 - isopropenyl - 1,4a - dimethylphenanthrene.

References Cited in the file of this patent
UNITED STATES PATENTS

| 2,656,344 | Ritchie | Oct. 20, 1953 |
| 2,704,283 | Jacobsen | Mar. 15, 1955 |

OTHER REFERENCES

Elsevier Encyclopaedia of Org. Chem., vol. 13, page 960, Elsevier Publ. Co., N. Y. (1946).